United States Patent Office 3,478,128
Patented Nov. 11, 1969

3,478,128
BLEND OF CRYSTALLINE BLOCK COPOLYMER
AND ETHYLENE-PROPYLENE RUBBER
Hugh J. Hagemeyer, Jr., and Marvin B. Edwards, Longview, Tex., assignors to Eastman Kodak Company, Rochester, N.Y., a corporation of New Jersey
No Drawing. Continuation-in-part of application Ser. No. 152,001, Nov. 13, 1961. This application Dec. 27, 1965, Ser. No. 516,783
Int. Cl. C08f 29/12
U.S. Cl. 260—876                                        7 Claims

ABSTRACT OF THE DISCLOSURE

A polymeric composition having an excellent combination of low temperature properties, comprising a highly crystalline block copolymer comprised of at least 90% polymerized propylene and the remainder being of polymerized ethylene, 1-butene or 1-hexene, in admixture with about 5 to 30 percent by weight of ethylene-propylene rubber.

---

This is a continuation-in-part of application Ser. No. 152,001, filed Nov. 13, 1961 and now abandoned.

This invention relates to novel polymer blends having improved physical properties and method for preparing the same. One of the aspects of this invention relates to novel blends of solid crystalline polymers, called polyallomers, having improved low temperature properties. Another aspect of this invention concerns novel blends of polyallomers and ethylene-propylene rubbers having improved physical properties.

In recent years, a number of high molecular weight polyallomer polymers having crystalline structures have been prepared by polymerizing α-monoolefins containing at least 2 carbon atoms. Propylene-ethylene polyallomer is one such high molecular weight polymer which has found wide acceptance by the plastics industry, in a number of different applications including, for example, use in fibers, molding and coating applications, depending upon the specific properties of the polymer. However, while this material may be useful for a wide variety of uses these polymers are, however, limited in particular uses since they do not exhibit the particular combination of good stiffness, tensile strength, elongation, impact strength, hardness and brittle point necessary for such uses at low temperatures. For example, propylene-ethylene polyallomer plastics have relatively good low temperature properties, however, these plastics are somewhat limited in use for frozen foods or used in wire and cable insulation, plastic pipe, etc., where especially good low temperature properties and good impact strengths are required. It is evident, therefore, that the state of the art will be greatly enhanced by providing polymeric compositions combining the excellent physical properties of the polyallomers with especially good low temperature properties and improved impact strengths.

Accordingly, it is one of the objects of this invention to provide novel polymeric compositions having improved physical properties.

Another object of the invention is to provide novel blends of polymeric materials having improved low temperature properties.

A further object of this invention is to provide novel polyallomer blends having improved low temperature properties without substantial degradation of the other desirable properties of polyallomers.

Still another object of the present invention is to provide novel polyallomer compositions having improved impact strength and good low temperature properties.

Further objects of this invention will be come apparent from an examination of the following description and claims.

In accordance with this invention, it has been found that the especially good low temperature properties and impact strength of polyallomers can be improved by blending the polyallomers with ethylene-propylene rubber without substantial degradation in tensile strength, stiffness in flexure, and other desirable physical properties of the polyallomer. Hence, polymeric blends of crystalline polyallomers containing about 2 to about 50% and more preferably 5 to 30% by weight, based on the blend of ethylene-propylene rubber, as hereinafter described, has been found to exhibit improved impact strength and good low temperature properties over conventional polyallomers.

The unusual compatibility of highly crystalline polyallomer with materials of substantially unrelated and widely varying molecular structures is quite unexpected in view of the poor compatibility of conventional polyethylene or polypropylene and these same materials. Thus, when the modifiers of this invention are incorporated into high density or into conventional polyethylene they are found to be substantially incompatible.

It is readily apparent that the compositions of this invention, which are characterized by substantially greater Izod notched impact strengths at 23° C. and lower brittleness temperatures, greatly increases the value of polyallomer as a plastic material when compared with unmodified polyallomer since the modified material may be used in applications requiring both good low temperature and Izod impact strength characteristics.

The polyallomers are solid, crystalline polymers synthesized from two or more ethylenically unsaturated monomers in which the polymer chains comprise joined segments of homopolymerized ethylenically unsaturated monomer, each such segment being capable of crystallization. The polyallomers are not to be confused with prior art homopolymers or copolymers, amorphous or crystalline, since these prior art homopolymers or copolymers do not exhibit the excellent combination of properties or the chemical structure exhibited by the polyallomers. One method for preparing polyallomers useful in the present invention is disclosed in application Ser. No. 152,001 filed Nov. 13. 1961 and now abandoned.

The polyallomers are prepared by polymerizing crystalline segments of a polymerizable α-monoolefin containing 2 or more carbon atoms onto preformed crystalline segments of the polymer chains formed from a different polymerizable α-monoolefin containing 2 or more carbon atoms using a solid stereospecific polymerization catalyst to form a polymer having at least 80% crystallinity. A preferred catalyst is a mixture of equimolar amounts of $LiAlH_4$, $TiCl_3$ and $NaF$. This catalyst is operative at temperatures above 150° C., where the polymer is in solution. One such method of preparing polyallomers is a multistage polymerization procedure comprising initially polymerizing a polymerizable monomer, for example, propylene and then polymerizing at least one different polymerizable monomer, for example, an α-monoolefinic hydrocarbon such as ethylene, onto the polymer chain of the first monomer using a solid stereospecific polymerization catalyst. Thus, propylene or other α-monoolefinic hydrocarbon for example, is contacted with a solid stereospecific polymerization catalyst to form a crystalline polymer chain and the second monomer is then polymerized onto the preformed polymer chain in the presence of the solid stereospecific catalyst such as for example a 2/1/3 molar ratio of ethyl aluminum sesquichloride, hexamethyl phosphoramide and titanium trichloride. To prepare the propylene polyallomers in which the polymer chains are crystalline body segments of propylene terminated by crystalline tail segments of other α-monoolefinic hydrocarbons the polymerization reaction is continued until the resulting polymer contains at least 80 percent, by weight, of polymerized propylene. This multistage process can be conducted in a single reactor having separate reaction zones preferably separated by a baffle or other separation means. However, the separate polymerization reactions forming our process can also be conducted in separate reactors arranged in series and alternatively the entire process could be carried out in an elongated tubular reactor. The polyallomers can also be produced batchwise by carrying out the first stage of the polymerization with a polymerizable monomer, for example, propylene or other α-monoolefinic hydrocarbon and adding a second α-monoolefinic hydrocarbon after a portion of the first monomer, for example, 20–30 percent, has been polymerized. However, in the preparation of the propylene polyallomers it is preferred that the propylene be employed as a monomer in the first stage. The exact amount of monomer feed after the first stage of the reaction is subject to wide variation depending upon such variables as the reaction conditions employed, the percent of monomer converted in the first stage, the desired molecular weight of the resulting polyallomer and similar factors. Consequently, the amount of monomer fed in a specific situation will depend upon the correlation of the several variable factors. However, in the case of the preferred propylene polyallomers this amount of monomer will be such that the resulting polyallomer contains at least 0.1 percent, by weight of an α-monoolefinic hydrocarbon other than propylene, in polymerized form, and preferably at least 80 percent, by weight, of propylene in polymerized form.

In forming the preferred propylene polyallomers, the α-monoolefinic hydrocarbons used as comonomers are readily polymerizable ethylenically unsaturated hydrocarbons, and preferably the ethylenically unsaturated hydrocarbons containing 2 to 10 carbon atoms, as exemplified by ethylene, butene-1, pentene-1, 3-methylbutene-1, 4-methylpentene-1, 4-methylhexene-1, 5-methylhexene-1, 4,4-dimethylpentene-1, hexene-1, heptene-1, decene-1, styrene, vinyl cyclohexane and the like.

One of the particular significant characteristics of a polyallomer which can be used to distinguish it from prior art polymers and polymer blends is its excellent combination of physical properties. Propylene-ethylene polyallomer, for example, combines high stiffness, tensile strength, and melting point with excellent stress crack resistance, good moldability, and high clarity. Other significant characteristics of the polymer are crystallinity and inherent viscosity. Thus, these polyallomers generally exhibit at least 80% crystallinity and preferably a crystallinity of 90% or more. This crystallinity is measured by insolubility in boiling hexane or by X-ray diffraction. It has also been found that polyallomers differ markedly from crystalline polypropylene and high density polyethylene when subjected to certain solubility and extractability tests. Thus, polyallomers exhibit an extremely high solubility in xylene in comparison to that of crystalline polypropylene and high density polyethylene, although their solubility in hexane and ethyl acetate are comparable to that of polypropylene. To illustrate this point, solubility data on a number of typical polyallomers, polypropylene and high density polyethylene of comparable molecular weight are set forth in the following table.

TABLE 1

|  | Solubility Xylene | Extractables, Percent | |
|---|---|---|---|
|  |  | Hexane | Ethyl Acetate |
| Polyallomers, (percent) C₂H₄: |  |  |  |
| 0.9 | 12.4 | 1.9 | 1.0 |
| 1.4 | 18.8 | 5.4 | 1.0 |
| 1.8 | 20.8 |  |  |
| 2.1 | 20.5 | 3.1 | 1.1 |
| 2.1 | 20.8 |  |  |
| 2.9 | 26.1 | 2.3 | 0.8 |
| 3.1 | 24.3 | 4.2 | 1.0 |
| 4.4 | 33.3 | 3.5 | 0.4 |
| Polypropylene | {6.1, 6.6} | 1.6, 1.5 | 0.4, 0.6 |
| High Density Polyethylene | {0.7, 0.9} |  |  |

The inherent viscosities exhibited by polyallomers are of particular interest in molding applications. Thus, with inherent viscosities up to about 2.4, the polyallomers have good flow properties and can be molded without degradation. In contrast, crystalline polymers having inherent viscosities in excess of 2.4 are very difficult to mold without degradation which detrimentally affects their physical properties.

It is therefore apparent that polyallomers represent a new class of polymeric materials having rather superior physical properties when compared with prior art homopolymers and copolymers, amorphous and crystalline. Further, that while these polyallomers have physical properties that enable them to be used in applications where the prior art polymers would be undesirable, nevertheless it would be a significant advance in the art to further improve the physical properties of the polyallomers to provide polymeric compositions as disclosed herein having substantially improved physical properties when compared with unmodified polyallomers.

Hence, it has been found that a rather substantial improvement in physical properties can be obtained by blending polyallomers with ethylene-propylene rubber. The terminology "ethylene propylene rubber" includes copolymers of ethylene and propylene and terpolymers prepared by copolymerizing ethylene and propylene with minor amounts of a non-conjugated diene such as dicyclopentadiene or 5-methylene-2-norbornene. The ethylene-propylene rubber may be blended in an amount from 2–50%, by weight, with polyallomer, preferably about 5 to 30%, by weight, of the ethylene-propylene rubber is blended with polyallomer. The blending may be done in conventional mixing equipment such as hot rolls, rubber mills, or a Banbury mixer. It is also possible to blend the ethylene-propylene rubber with the polyallomer by mixing solutions of the two polymers in an appropriate solvent, and then stripping the solvent from the polymer blend prior to use, such as by extrusion or pelleting. The ethylene-propylene rubbers useful in the present invention are well-known materials and can be prepared by copolymerizing ethylene and propylene. Small amounts of third monomer, preferably a non-conjugated diene, can be added to give unsaturation. The polymerization is usually carried out at a temperature below 100° C. using a coordination catalyst comprised of aluminum alkyls and alkyl aluminum chloride and vanadium oxychloride. The various grades of ethylene propylene rubber ranging in unsaturation from 0–5 mole percent and available commercially are satisfactory resins for the blends of this invention. Such ethylene-propylene rubbers available commercially which may be used are, for example, Enjay's EPR–404, Enjay's EPT 3509, U.S. Rubber Company's Royalene 200 and EPT, and E. I. Du Pont's EPT Nordel.

The polymer blends according to this invention can also contain various additives such as stabilizers, antioxidants, plasticizers, lubricants, carbon black, fillers, or coloring agents which are normally used in polyolefins. Such additives can be added to the composition of this invention in necessary amounts, as is known to those skilled in the art, without significantly detracting from the beneficial properties of the blends.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A propylene polyallomer containing 3.0 weight percent ethylene was modified by blending with a commercial ethylene propylene rubber, Enjay Chemical Corporation's EPR–404. The blend was prepared by mill rolling the mix, granulating, then extruding and chopping into pellets. The properties of the blend determinend on injection-molded specimens are as follows:

| Components: | | | |
|---|---|---|---|
| Propylene-ethylene polyallomer containing 3.0% ethylene | 100 | 90 | 80 |
| Ethylene-propylene rubber (EPR 404) having 63 mole percent ethylene | | 10 | 20 |
| Properties: | | | |
| Flow rate at 230° C. and 2,160 g. load [1] | 2.26 | 2.05 | 1.91 |
| Density [2] | 0.9017 | 0.9010 | 0.8980 |
| Brittleness temperature, ° C [4] | −19 | −32 | −34 |
| Tensile strength at 2 in./min.: | | | |
| At yield | 3,400 | 2,900 | 2,400 |
| Elongation | 610 | 650 | 780 |
| Vicat softening point, ° C | 121 | 119 | 122 |
| Tensile impact strength | 110 | 140 | 230 |
| Izod impact strength at 23° C., notched | 3.2 | No break | No break |
| Izod impact strength at −10° C., notched [3] | 1.2 | 1.41 | 12.5 |
| Izod impact strength at −40° C., unnotched | <0.4 | Twist | Twist |
| 3-mil film impact strength at 26": | | | |
| At >2 days | 390 at 13" | 380 | 810 |
| At 3 weeks | 400 at 13" | 640 at 13" | 690 |
| At 6 weeks | 370 at 13" | 345 | 770 |

[1] ASTM, D1238–62T.
[2] ASTM, D1505–57T.
[3] ASTM, D256–56.
[4] ASTM, D746–75T.

EXAMPLE 2

Propylene-ethylene polyallomer containing about 1.5 ethylene is modified with EPR 404. This composition has the following physical properties:

| Components: | | | |
|---|---|---|---|
| Propylene polyallomer containing 1.5% ethylene | 100 | 90 | 80 |
| Percent EPR 404 | | 10 | 20 |
| Properties: | | | |
| Flow rate at 230° C. and 2,160 g. load | 2.15 | 2.12 | 1.90 |
| Density | 0.906 | 0.903 | 0.899 |
| Brittleness temperature, ° C | −12 | −25 | −36 |
| Tensile strength at 2 in./min.: | | | |
| At fracture | 4,300 | 4,150 | 3,960 |
| Elongation | 400 | 490 | 600 |
| Stiffness in flexure | 125,000 | 122,000 | 118,000 |
| Vicat softening point, ° C | 138 | 134 | 135 |
| Hardness Rockwell R scale | 88 | 82 | 73 |
| Tensile impact strength | 74 | 92 | 110 |
| Izod impact strength at 23° C., Notched | 1.0 | 4.0 | No break |
| Izod impact strength at −10° C., Notched | 0.5 | 1.20 | 3.5 |

This blend can be used for making kickpanels, steering wheels, and pinch welds in the automotive trade.

EXAMPLE 3

Propylene-butene polyallomer containing 8.0 percent butene was blended with 10 percent EPR–404 ethylene-propylene rubber. The changes in low temperature and toughness properties are summarized in Table 5.

| Components: | | |
|---|---|---|
| Propylene-8% butene polyallomer | 100 | 80 |
| EPR 404, percent | | 20 |
| Properties: | | |
| Brittleness temperature, ° C | −15 | −45 |
| Tensile impact strength | 135 | 275 |
| Izod impact strength at −10° C., notched | 1.2 | 15.6 |
| 3-mil film impact strength at 26" | 290 | 613 |

EXAMPLE 4

Propylene-hexene polyallomer containing 5 percent hexene was blended with 20 percent EPR–404. The changes in properties are shown in the following table:

| Components: | | |
|---|---|---|
| Propylene-5%hexene polyallomer, percent | 100 | 80 |
| EPR 404, percent | | 20 |
| Properties: | | |
| Brittleness temperature, ° C | −12 | −34 |
| Tensile impact strength | 105 | 199 |
| Izod impact strength at 0° C., notched | 1.4 | 6.7 |

The polyallomer blends are superior to the corresponding polypropylene blends because the polyallomers are more compatible with the polymers and copolymers used to improve the low temperature and toughness properties. For example, the polyallomer blends show essentially no tendency to blush when bent or subjected to stress or impact. The polyallomer blends are clear and can be used for blown and cast film, whereas the polypropylene blends are opaque and completely unsatisfactory for these applications. The same is true of extruded sheet which is used in thermoforming. There is also a greatly reduced tendency for the polyallomer blends to crystallize upon ageing, whereas the polypropylene blends appear to separate and lose much of their toughness with time.

EXAMPLE 5

A comparison was made of injection molded properties of polypropylene and polyallomers blended with the same ethylenepropylene rubber. These properties are shown in the following table:

| Property | PP+10%EPR | 5021[1]+10%EPR | PP+20%EPR | 5021[1]+20%EPR |
|---|---|---|---|---|
| Flow rate at 230° C. and 2,160 g. load | 3.5 | 2.6 | 2.9 | 2.4 |
| Density | 0.903 | 0.900 | 0.893 | 0.894 |
| Brittleness temperature, °C | −10 | −25 | −27 | −49 |
| Tensile strength at 12″ min.: | | | | |
|   At yield | 3,600 | 3,350 | 2,700 | 2,400 |
|   Elongation | 760 | 600 | 300 | >650 |
| Vicat softening point, °C | 134 | 126 | 123 | 115 |
| Izod impact strength at 23° C.: | | | | |
|   Notched | 1.2 | 3.6 | 2.8 | 12.3 |
|   Unnotched | Twist | Twist | Twist | Twist |

[1] 5021 is a propylene-ethylene polyallomer containing 1.5% ethylene.

EXAMPLE 6

Propylene-ethylene polyallomer containing 1.5% ethylene was blended with 5 and 30 percent EPR–404 ethylene-propylene rubber. The changes in low temperature and toughness properties are summarized in the following table:

| | | | |
|---|---|---|---|
| Components: | | | |
|   Propylene, 1.5% ethylene polyallomer, percent | 100 | 95 | 70 |
|   EPR 404, percent | 0 | 5 | 30 |
| Properties: | | | |
|   Flow rate at 230° C. and 2,160 g. load | 2.5 | 2.3 | 1.7 |
|   Density | 0.904 | 0.903 | 0.887 |
|   Brittleness temperature, °C | −12 | −15 | −70 |
| Tensile strength at 2 in./min.: | | | |
|   At yield | 3,800 | 3,400 | 2,100 |
|   Elongation | >600 | >600 | >600 |
| Vicat softening point, °C | 132 | 130 | 110 |
| Izod impact strength at 23° C. notched | 1.2 | 2.5 | No break |
| Izod impact strength at −10° C. notched | 0.4 | 0.9 | 5.6 |

These data demonstrate that the polyallomer and ethylene-propylene rubber blends have far better impact strength and low temperature properties than the polypropylene-ethylene-propylene rubber blends or polyallomers without ethylene-propylene rubber.

The showings in Example 5 are exemplary of the good compatibility of the polyallomers with ethylene-propylene rubber. The characteristics of good low temperature properties and good impact strength qualify these blends as an excellent material for molded articles for low temperature uses. They have been found to possess superior qualities over the prior art blends for making tough blown bottles, refrigerator and freezer liners, tumblers for iced beverages, tough film for produce and feed bags and large garbage cans for outdoor winter use.

EXAMPLE 7

Propylene-ethylene polyallomer containing 1.5% ethylene was blended with 10 and 20% EPT 3509 ethylene-propylene terpolymer rubber. The changes in low temperature and toughness properties are shown in the following table:

| | | | |
|---|---|---|---|
| Components: | | | |
|   Propylene-1.5% ethylene polyallomer, percent | 100 | 90 | 80 |
|   EPT, 3509[1], percent | 0 | 10 | 20 |
| Properties: | | | |
|   Flow rate at 230° C. and 2,160 g. load | 2.5 | 2.1 | 1.9 |
|   Density | 0.904 | 0.899 | 0.893 |
|   Brittleness temperature, °C | −12 | −29 | −50 |
| Tensile strength at 2 in./min.: | | | |
|   At yield | 3,800 | 3,200 | 2,700 |
|   Elongation | >600 | >600 | >600 |
| Vicat softening point, °C | 132 | 126 | 118 |
| Izod impact strength at 23° C., notched | 1.2 | 3.9 | 9.4 |
| Izod impact strength at −10° C., notched | 0.4 | 2.0 | 3.9 |

[1] Obtained from Enjay Chemical Corp.

The blends of this invention are also useful for the preparation of films, molded objects, extruded shapes, tubular pipes, wire covering, etc., and conventional injection molding, compression molding and extrusion equipment can be used to form these articles. The blends of this invention are readily prepared in conventional equipment used for blending various agents with plastic materials. For example, they can be blended in Banbury mixers, in extrusion equipment or on hot rolls.

Although the invention has been described in considerable detail with reference to certain preferred embodiments thereof, it will be understood that variations and modifications can be effected without departing from the spirit and scope of the invention as described hereinabove and as described in the appended claims.

We claim:
1. A polymeric composition comprising a highly crystalline block copolymer comprised of at least 90% polymerized propylene and the remainder being of other polymerized alpha-monoolefin selected from the group consisting of ethylene, 1-butene, and 1-hexene, in admixture with about 5 to 30 percent by weight ethylene-propylene rubber, said crystalline block copolymer having a crystallinity of at least 80% measured by insolubility in boiling hexane.

2. The polymeric composition of claim 1 wherein the ethylene-propylene rubber ranges in unsaturation from about 1–5 mole percent.

3. A polymeric composition of claim 1 wherein the alpha-monoolefin is 1-butene.

4. A polymeric composition of claim 1 wherein the alpha-monoolefin is ethylene.

5. A polymeric composition of claim 1 wherein the alpha-monoolefin is 1-hexene.

6. A polymeric composition according to claim 1 wherein the crystalline block copolymer has a crystallinity of at least 90 percent.

7. A polymeric composition of claim 6 containing about 5 to 30 percent by weight ethylene propylene rubber.

References Cited

UNITED STATES PATENTS

| | | | |
|---|---|---|---|
| 3,036,987 | 5/1962 | Ranalli | 260—897 |
| 3,137,672 | 6/1964 | Lehane | 260—897 |
| 3,250,825 | 5/1966 | Martinovich | 260—897 |
| 3,262,992 | 7/1966 | Holzer et al. | 260—876 |

FOREIGN PATENTS 941,083    11/1963    Great Britain.

GEORGE F. LESMES, Primary Examiner

U.S. Cl. X.R.

260—878